(12) United States Patent
Ragunathan et al.

(10) Patent No.: US 8,725,856 B2
(45) Date of Patent: May 13, 2014

(54) DISCOVERY OF NETWORK SERVICES

(75) Inventors: Ravichandran Ragunathan, Ladera Ranch, CA (US); Attaullah Seikh, Irvine, CA (US); Rajini Bala Giridharagopal, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 12/826,555

(22) Filed: Jun. 29, 2010

(65) Prior Publication Data

US 2011/0320739 A1  Dec. 29, 2011

(51) Int. Cl.
*G06F 15/173* (2006.01)

(52) U.S. Cl.
USPC ........... 709/223; 709/203; 709/217; 709/224; 709/225

(58) Field of Classification Search
USPC ......... 709/203, 217, 220, 223, 224, 225, 228, 709/230
See application file for complete search history.

(56) References Cited

U.S. PATENT DOCUMENTS

| | | | | |
|---|---|---|---|---|
| 5,548,722 | A * | 8/1996 | Jalalian et al. | 709/220 |
| 6,167,449 | A * | 12/2000 | Arnold et al. | 709/227 |
| 7,181,442 | B2 * | 2/2007 | Yeh et al. | 709/225 |
| 7,562,127 | B2 * | 7/2009 | Sakamoto et al. | 709/223 |
| 7,640,348 | B2 | 12/2009 | Atwal et al. | |
| 7,904,552 | B2 * | 3/2011 | Kufluk et al. | 709/224 |
| 8,156,564 | B2 * | 4/2012 | West et al. | 726/27 |
| 2002/0095488 | A1 * | 7/2002 | Primak | 709/223 |
| 2002/0184368 | A1 * | 12/2002 | Wang | 709/224 |
| 2004/0059722 | A1 * | 3/2004 | Yeh et al. | 707/3 |
| 2005/0044148 | A1 * | 2/2005 | Son et al. | 709/205 |
| 2005/0138065 | A1 * | 6/2005 | Ciriza | 707/104.1 |
| 2005/0193106 | A1 * | 9/2005 | Desai et al. | 709/223 |
| 2005/0198250 | A1 * | 9/2005 | Wang | 709/223 |
| 2006/0026261 | A1 * | 2/2006 | Allday et al. | 709/217 |
| 2007/0143449 | A1 * | 6/2007 | Wray West et al. | 709/219 |
| 2008/0065683 | A1 | 3/2008 | Theeten | |
| 2008/0104258 | A1 * | 5/2008 | O'Neill et al. | 709/228 |

OTHER PUBLICATIONS

M. Dyrna, "Peer2Peer Network Service Discovery for Ad hoc Networks", pp. 1-15 (Nov. 2003).

* cited by examiner

*Primary Examiner* — Ramy M Osman
(74) *Attorney, Agent, or Firm* — Fitzpatrick, Cella, Harper & Scinto

(57) ABSTRACT

Discovery of network services consumable by a client executing on a first device. A request is received from the client for a list of services. There is a determination of whether a second device on the network which maintains a current list of services can or can not be located. Responsive to a determination that the second device can not be located, a local cached copy of a list of services is returned to the client. Responsive to a determination that the second device can be located, a request for the current list of services is sent to the second device, and a response containing the current list of services is received from the second device. The current list of services is returned to the client.

72 Claims, 6 Drawing Sheets

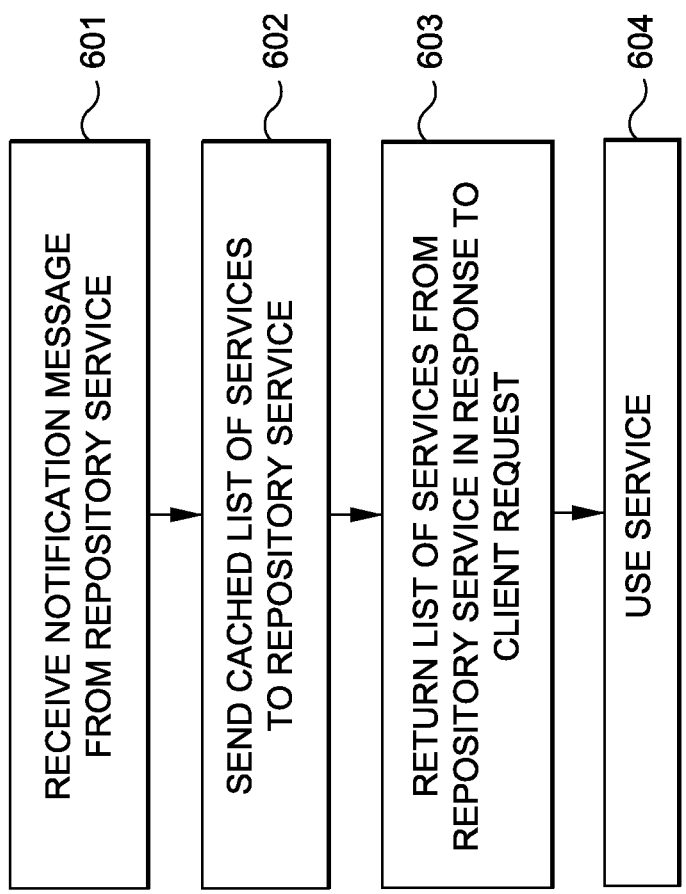

DISCOVERY OF NETWORK SERVICES

FIELD

The present disclosure relates to discovery of services on a network, and more particularly relates to discovery of services on a network in which such services might be hosted or consumed by devices with constrained resources.

BACKGROUND

In network computing, it is common for each device to discover other services available on the network. To that end, devices on the network may expose their own services for use by other devices on the network, and may obtain a list of services currently available from other devices on the network. In this way, devices are made aware of services across the network which can be utilized to accomplish a task.

SUMMARY

Although the general need for service discovery is recognized, the precise architecture by which service discovery is accomplished is the subject of ongoing efforts.

According to one architecture proposed by the inventors herein, service discovery is accomplished through two intrinsic services that run on each device: a node service and a service repository service. The service repository service maintains a list of services available on the network and metadata information of devices that host such services. The node service manages synchronized access to the service list of the service repository service, so as to provide consumers on the device with the list of services. See U.S. application Ser. No. 12/717,862, filed Mar. 4, 2010, titled "Synchronizing Services Across Network Nodes", by Ravichandran Ragunathan et al., the contents of which are incorporated herein by reference.

One challenge with discovering services via the aforementioned node service and service repository service concerns devices which have limited or constrained resources, such as a mobile phone or PDA. In such devices, maintenance of the service list by the service repository service may unduly consume resources which are already constrained.

The foregoing situation is addressed in such devices by using a hybrid approach that utilizes a lightweight service repository communication stub module ("SR communication stub module"). The SR communication stub module provides the same functional interface as a full service repository to clients on the device. In particular, the SR communication stub module calls another network device to provide a list of services, or provides a cached local list of services if the list can not be obtained from another network device.

Thus, in an example embodiment described herein, for a first device which includes a client that consumes services as well as a network interface for communication with other devices over a network, a request is received from the client for a list of services. There is a determination of whether a second device on the network which maintains a current list of services can or can not be located. Responsive to a determination that the second device on the network which maintains a current list of services can not be located, a local cached copy of a list of services is returned to the client. Responsive to a determination that the second device on the network which maintains a current list of services can be located, a request for the current list of services is sent to the second device, and a response containing the current list of services is received from the second device. The request and the response are communicated via the network interface, and the current list of services is returned to the client. In addition, a local copy of the current list of services is cached for future use in the event that there is a determination that the second device on the network which maintains a current list of devices can not be located.

By calling on another network device to provide a list of network services or providing a cached local list of services if no such device can be found, it is ordinarily possible for a device with constrained resources to participate in network computing, even though it itself might not be completely capable of hosting a full service repository service or otherwise maintaining a list of services available on the network.

Therefore, there is ordinarily no need for a dedicated proxy, as the constrained device can obtain service lists from any available network device with a functioning service repository. Moreover, since the SR communication stub manages access to a local cached list of services, it is ordinarily possible for local services and clients to function even when the device is disconnected from the network.

In one example, clients that wish to connect to a service that resides on another network device can request for a list of services of a certain type, and the SR communication stub module (using an node service module) can obtain a list of such services. Additionally, services running on an occasionally connected device can request the SR communication stub module to publish the services for use by clients residing on other devices.

Another example embodiment registers one or more services executing on a first device. The first device includes a network interface for communication with other devices over a network. A request for registration is received from a service executing on the first device. There is a determination of whether a second device on the network, which implements a repository service to maintain a current list of services, can or can not be located. Responsive to a determination that the second device on the network which implements a repository service to maintain a current list of services can not be located, the service is registered in a local cached copy of a list of services. Responsive to a determination that the second device on the network which implements a repository service to maintain a current list of services can be located, a notification message is sent to the second device for registration of the service executing on the first device with the repository service on the second device.

By registering the service on a remote network service repository (if possible) or locally at the device (if not), it is ordinarily possible to at best share the service with the network, but at a minimum to make the service available locally to a client of the device.

Still another example embodiment pertains to relinquishment of responsibility for synchronization of a local cached list of services maintained by a first device. The first device includes a network interface for communication with other devices over a network. A notification message is received from a repository service implemented on a second device on the network. The repository service implemented on the second device maintains a list of services available on the network. Responsive to the notification message received from the second device, the cached list of services on the first device is sent to the repository service implemented on the second device.

By relinquishing responsibility for synchronization of a local cached list of services to a device maintaining a list of services on the network, it is ordinarily possible to ensure that local services are shared across the network.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 6 is a flowchart illustrating a process for relinquishing responsibility for a list of services according to an example embodiment.

DETAILED DESCRIPTION

Figure 1:
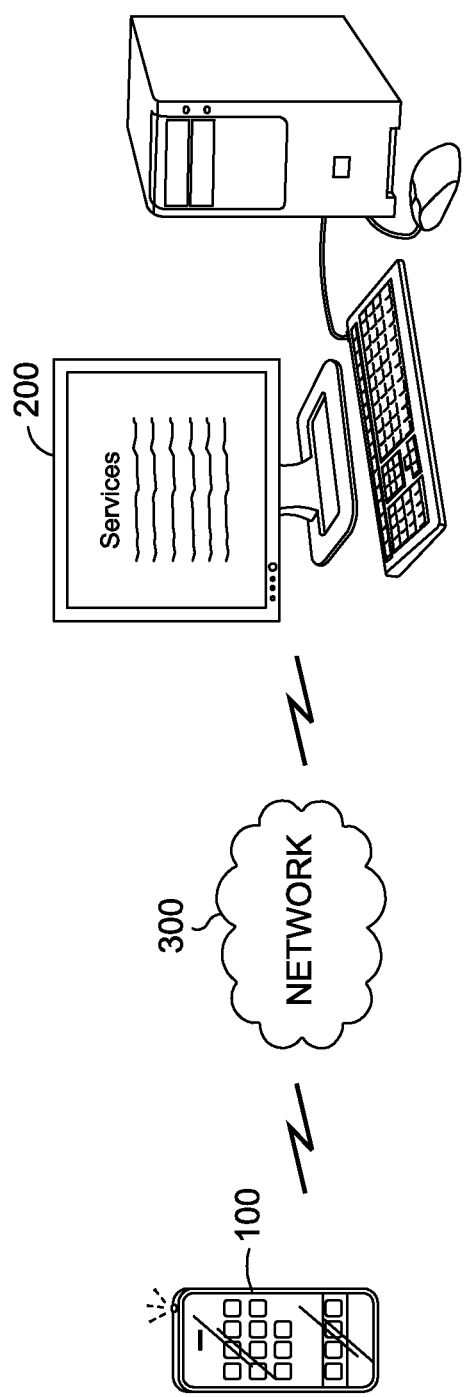
FIG. 1 illustrates an example environment in which aspects of the present disclosure may be practiced.

FIG. 1 illustrates an example environment in which aspects of the present disclosure may be practiced.

As shown in FIG. 1, client device 100 communicates with computer 200 over network 300. Client device 100 generally comprises a programmable general purpose mobile computer having an operating system, such as Microsoft® Windows®, Apple® Mac OS® LINUX, or Symbian, and which is programmed as described below so as to perform particular functions and, in effect, become a special purpose computer when performing these functions.

In the example embodiment shown, a client on client device 100 seeks access to services available on network 300. In that regard, client device 100 may have limited capabilities as compared to other devices on network 300. For example, client device 100 may have limited or constrained resources, such that maintenance of a service list of services on network 300 may unduly consume resources in client device 100.

While FIG. 1 depicts client device 100 as a mobile phone, computing equipment for practicing aspects of the present disclosure can be implemented in a variety of embodiments. Such embodiments will ordinarily exhibit constraints on resources, such as constraints on one or more of computing power, network bandwidth and/or range, memory, persistent storage, user interface capabilities, and the like. For example, client device 100 can be embodied as a laptop or notebook, a personal digital assistant (PDA), or a portable media player, among many other embodiments.

Computer 200 is architected as a PC, and corresponds to a network node. As shown in FIG. 1, computer 200 maintains a current list of services on network 300. These services can include, for example, file conversion services, data streaming services, database services, printing services and so on. In some cases, however, there may not be any available nodes on the network which maintain a current list of services.

For purposes of conciseness, only client device 100 and computer 200 are shown in FIG. 1, but of course, any number and type of peer nodes may exist on network 300. In particular, it should be appreciated that a much larger and/or more diverse assortment of client devices and network nodes may exist on network 300.

Network 300 transmits data between client device 100 and computer 200. The implementation, scale and hardware of network 300 may vary according to different embodiments.

Thus, for example, network 300 could be the Internet, a Local Area Network (LAN), Wide Area Network (WAN), Metropolitan Area Network (MAN), or Personal Area Network (PAN), among others. Network 300 can be wired or wireless, and can be implemented, for example, as an Optical fiber, Ethernet, or Wireless LAN network. In addition, the network topology of network 300 may vary.

Figure 2:
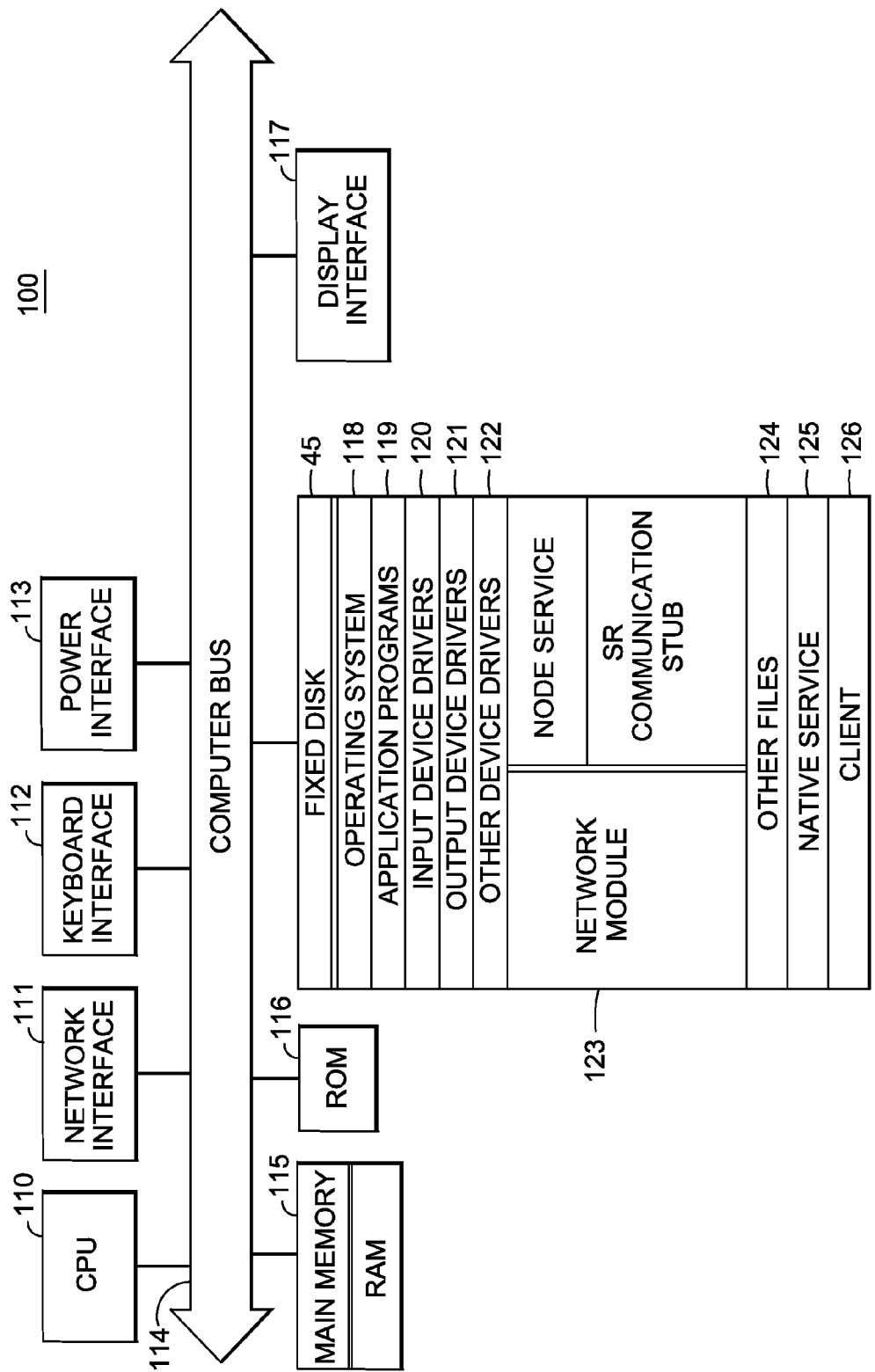
FIG. 2 is a detailed block diagram depicting the internal architecture of the client device shown in FIG. 1 according to an example embodiment.

FIG. 2 is a detailed block diagram depicting the internal architecture of the client device 100 shown in FIG. 1. As shown in FIG. 2, client device 100 includes central processing unit (CPU) 110 which interfaces with computer bus 114. Also interfacing with computer bus 114 are fixed disk 45 (e.g., a hard disk or other nonvolatile storage medium), network interface 111 for accessing other devices across network 300 including peer nodes of network-enabled devices on network 300, keyboard interface 112, power interface 113, random access memory (RAM) 115 for use as a main run-time transient memory, read only memory (ROM) 116, and display interface 117 for a display screen or other output.

RAM 115 interfaces with computer bus 114 so as to provide information stored in RAM 115 to CPU 110 during execution of the instructions in software programs, such as an operating system, application programs, image processing modules, and device drivers. More specifically, CPU 110 first loads computer-executable process steps from fixed disk 45, or another storage device into a region of RAM 115. CPU 110 can then execute the stored process steps from RAM 115 in order to execute the loaded computer-executable process steps. Data, such as addresses of peer nodes on network 300, or other information, can be stored in RAM 115 so that the data can be accessed by CPU 110 during the execution of the computer-executable software programs, to the extent that such software programs have a need to access and/or modify the data.

As also shown in FIG. 2, fixed disk 45 contains computer-executable process steps for operating system 118, and application programs 119, such as printing management programs. Fixed disk 45 also contains computer-executable process steps for device drivers for software interface to devices, such as input device drivers 120, output device drivers 121, and other device drivers 122. Other files 124 are available for output to output devices and for manipulation by application programs.

As mentioned above, client device 100 may have limited or constrained resources, such as constraints on one or more of computing power, network bandwidth and/or range, memory, persistent storage, user interface capabilities, and the like. In particular, client device 100 might not be capable of hosting a full service repository service or otherwise maintaining a list of services available on the network.

Native service 125 runs on client device 100 and may be consumed by other nodes on the network. In particular, native service 125 may be added to a local cached list of services available only to client device 100, or, if possible, may be registered on a list of services available on the network, as described more fully below. Examples of a native service in the context of client device 100, which in this example embodiment is a mobile phone, include access to messages on the mobile phone, internet connectivity, calendar functions and camera services, among many others.

Client 126 may request a list of available services, and may in response receive either a local cached list of services or a list of services on the network, as described more fully below. Additionally, client 126 may include a connector service (not shown) providing a client application program interface (API) gateway to the node service and the SR communication stub. The connector service may act as a proxy for dealing with a client application, for example by exposing local or peer services and events such as a service change to a client application.

Network module 123 comprises computer-executable process steps for obtaining a list of services consumable by a client executing on client device 100, and generally comprises a node service and a service repository communication stub ("SR communication stub") for a service repository. More specifically, network module 123 is configured to utilize the SR communication stub, which acts as a lightweight service. The SR communication stub determines whether a full service repository exists on client device 100, calls on a node service to obtain a list of services from another network device if client device 100 does not include a full service repository, and provides a cached local list of services to the client if the list can not be obtained from another network device. These processes will be described in more detail below.

The computer-executable process steps for network module 123 may be configured as part of operating system 118, as part of an output device driver, such as a print processing driver, or as a stand-alone application program. Network module 123 may also be configured as a plug-in or dynamic link library (DLL) to the operating system, device driver or application program. It can be appreciated that the present disclosure is not limited to these embodiments and that the disclosed modules may be used in other environments.

Figure 3:
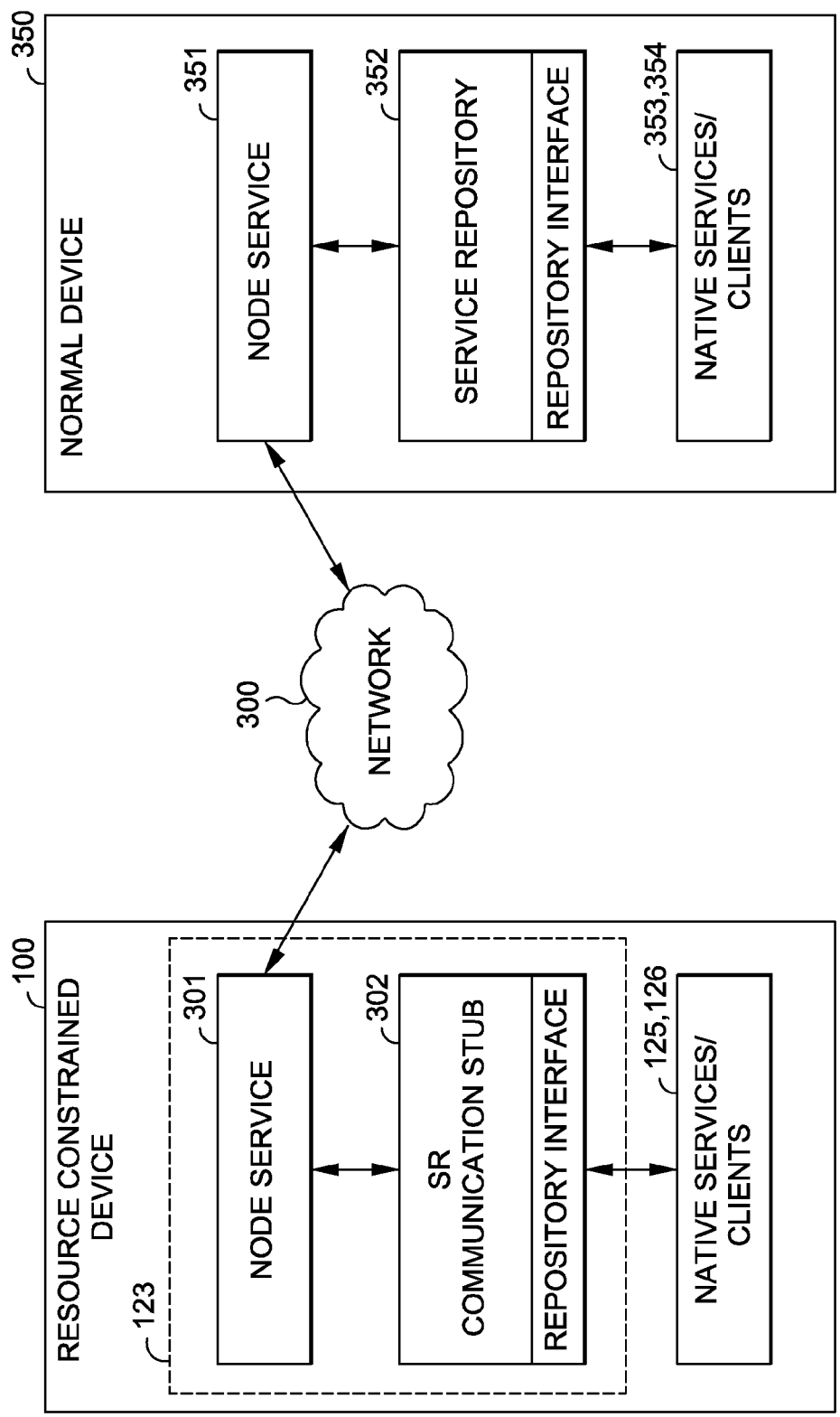
FIG. 3 is a view for explaining a network module according to an example embodiment.

FIG. 3 illustrates an example of network module 123 in which the sub-modules of network module 123 are included in fixed disk 45. Specifically, FIG. 3 illustrates an example of an network module 123 for providing a list of services to a client. Each of the sub-modules are computer-executable software code or process steps executable by a processor, such as CPU 110, and are stored on a computer-readable storage medium, such as fixed disk 45 or RAM 115. More or less modules may be used, and other architectures are possible.

As shown in FIG. 3, network module 123 includes node service 301. Node service 301 communicates with SR communication stub 302 and with other devices, such as device 350, over network 300.

Specifically, node service 301 acts as an agent for SR communication stub 302 in regards to obtaining access to services available across the network. In particular, node service 301 acts on behalf of SR communication stub 302 and clients to determine whether another device on the network maintains a full list of services, and to request the list of services if such a device is found.

Node service 301 and SR communication stub 302 may communicate with each other using a predesignated communication framework, such as the communication between a node service and a full service repository service. In addition, a second device on the network may include a service list, and thereby a second node service and a service repository service which communicate with each other using the same predesignated communication framework as that of the client device. The service repository service of the second device can maintain a current list of services by performing service discovery over the network, as described in more detail in above-mentioned U.S. application Ser. No. 12/717,862.

SR communication stub 302 receives a request for the list of services from the client, and returns the list to the client. In that regard, SR communication stub 302 requests node service 301 to determine whether another device on the network which maintains a current list of services can or can not be located. SR communication stub 302 can then provide a list of services on the network obtained by node service 301, if possible, or provide a cached local list of services to the client if the list can not be obtained from another network device.

As shown in FIG. 3, SR communication stub 302 includes a repository interface, which is used to interface with native services 125 and clients 126.

In that regard, the repository interface may manage access to the native services at client device 100, and may also be used to determine whether a full service repository exists on device 100. In particular, SR communication stub 302 uses the repository interface to determine whether the client device itself implements a service repository or otherwise stores a service list. In some cases, client device 100 could maintain a service repository or otherwise maintain a current list of services on the network, in which case SR communication stub 302 would simply return a list of services to the client. However, in the example embodiment described herein, client device 100 has constrained resources, and thus does not maintain a service repository or other list of services currently available on the network.

Accordingly, SR communication stub 302 requests node service 301 to attempt to contact another (second) device on network 300 which does implement a service repository. For example, as shown in FIG. 3, SR communication stub 302 requests node service 301 to contact device 350, which implements node service 351 and a full service repository 352 including a repository interface for local service(s) 353 and client(s) 354.

In particular, node service 301 may send a request for the current list of services to another (second) device, and receive a response containing the current list of services from the second device. More specifically, node service 301 may broadcast a request for discovery of service repository services implemented at other devices on the network, and determine whether an announcement from a service repository service is received from another device on the network.

If node service 301 is successful in obtaining a service list from a service repository 352 of the second device 350, SR communication stub 302 provides the service list back to the originating client. SR communication stub 302 can also cache a local copy of the current list of services for future use in the event that there is a determination that the second device on the network which maintains a current list of devices can not be located. On the other hand, if node service 301 is not successful in obtaining a service list, it may return an error, and SR communication stub 302 may return a cached local list of services to the client.

In one communication framework, node service 301 may synchronize services and content with other nodes on the network by multicasting a change notification responsive to a change in the services available locally at network-enabled devices, and by listening to multicasts of change notifications from peer nodes, as described in more detail in above-mentioned U.S. application Ser. No. 12/717,862.

By virtue of the above arrangement, clients can treat SR communication stub 302 the same as a full service repository. In particular, a client can simply ask SR communication stub 302 for a service list, without knowing whether the list is a cached local list of services or a network service list from a full service repository on the network. Thus, a client can request the list of services without being aware of whether there is a service repository at the client device or not, as the list of services is obtained on behalf of the client by SR communication stub 302, utilizing node service 301. In other words, the client simply asks for a list of services, and is provided with such.

Accordingly, clients that wish to connect to a service that resides on another network device can request a list of services, and SR communication stub 302 will acquire that list of services on-demand. Moreover, since SR communication stub 302 can access native local services, it is ordinarily possible for local services and clients to function even when the client device is disconnected form the network.

In addition, in an example embodiment described below with respect to FIG. 5, services that run on an occasionally connected client device can request the SR communication stub 302 to publish them for use by clients residing on other devices. Specifically, responsive to a determination that another service repository exists on the network, SR communication stub 302 may provide the local list of services to node service 301 for transmission to the remote service repository, so as to keep the remote service repository current.

Furthermore, in an example embodiment described below with respect to FIG. 6, in the case that node service 301 receives a notification message from a repository service implemented on a second device on the network which maintains a list of services available on the network (e.g., device 350), SR communication stub 302 may send a local cached list of services to node service 301 for transmission to the repository service implemented on the second device, to thereby relinquish responsibility of synchronization of the local list.

FIG. 3 also depicts other modules which may interact with network module 123. In particular, as described above, native service(s) 125 may be registered locally so as to be available only to client device 100 or externally so as to be available on network 300. Client(s) 126 may request a list of available services, and may in response receive either a local cached list of services or a list of services on the network.

An example process for obtaining a list of services according to an example embodiment will now be described with respect to FIG. 4.

Figure 4:
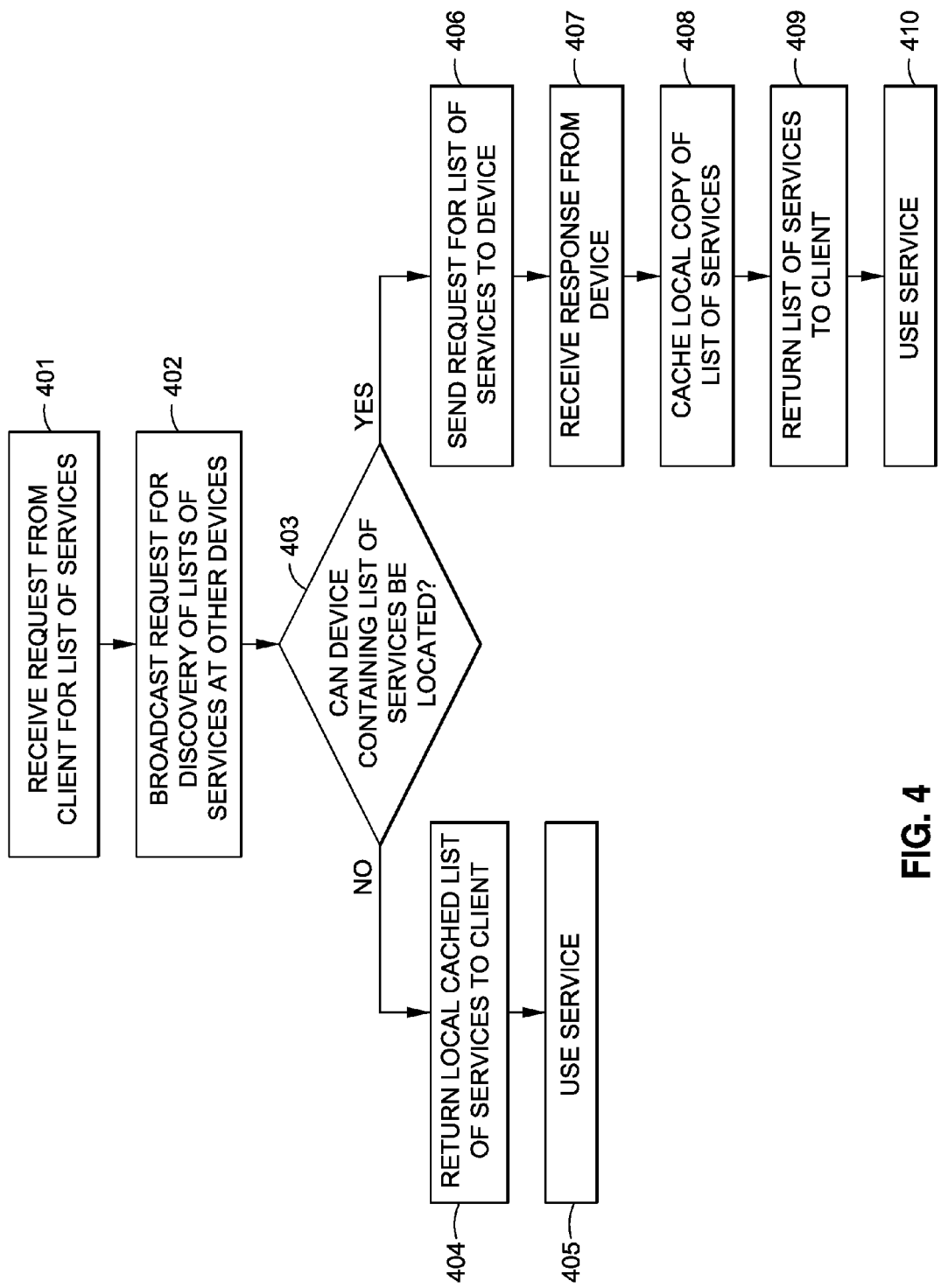
FIG. 4 is a flowchart illustrating a process for obtaining a list of services according to an example embodiment.

Briefly, in FIG. 4, for a first device which includes a client that consumes services as well as a network interface for communication with other devices over a network, a request is received from the client for a list of services. There is a determination of whether a second device on the network which maintains a current list of services can or can not be located. Responsive to a determination that the second device on the network which maintains a current list of services can not be located, a local cached copy of a list of services is returned to the client. Responsive to a determination that the second device on the network which maintains a current list of services can be located, a request for the current list of services is sent to the second device, and a response containing the current list of services is received from the second device. The request and the response are communicated via the network interface, and the current list of services is returned to the client. In addition, a local copy of the current list of services is cached for future use in the event that there is a determination that the second device on the network which maintains a current list of devices can not be located.

For purposes of this example embodiment, it should be assumed that there is not a full service repository or list of services on the network stored locally at the client device. In some cases, the client device could maintain a service repository or otherwise maintain a current list of services on the network, in which case the node service would simply return a list of services from the service repository for transmission to the client. However, in the present example embodiment, the client device has limited or constrained resources such that maintenance of a service repository unduly consumes resources, and thus a full service repository is not implemented.

In step 401, a request is received from the client for a list of services. For example, a request may be received from a client service representing an application on the client device.

In that regard, to further reduce consumption of constrained resources, the request for a list of services could be constrained or filtered to a smaller set of all available services. For example, the client request could be constrained or filtered by service type, the network nodes to search (see below), the service name(s), or by the network location or organization, among other factors. By constraining the requested services, it might be possible to limit the amount of information exchanged and stored locally.

In step 402, the node service broadcasts a request for discovery of lists of services at other devices on the network. In particular, the client device can determine whether a second device on the network which maintains a current list of devices can or can not be located by broadcasting a request for discovery of service repository services implemented at other devices on the network, and determining whether an announcement from a service repository service is received from another device on the network, as described in more detail in above-mentioned U.S. application Ser. No. 12/717, 862.

In step 403, there is a determination of whether a second device on the network, which maintains a current list of services, can or can not be located. In one example, this can be accomplished by determining whether a response has been received from a service repository service on another device on the network before a predetermined time has elapsed. Specifically, if the node service does not receive a response from a second device with a service repository service, there is a determination that a device containing a list of services can not be located on the network.

In step 404, responsive to a determination that the second device on the network which maintains a current list of services can not be located, a local cached copy of a list of services to the client.

In particular, since it is not possible to locate a device storing a full and/or current list of services on the network, the local cached copy of a list of services is returned to the client, so that the client has at least that list of services. In that regard, the local cached copy of a list of services may only include services locally at the device. On the other hand, if the client device has previously been able to locate a service repository and obtain a service list on the network, the local cached copy of a list of services may still store those network services in addition to the local services. As mentioned above, a SR communication stub has access to services available locally at client device, and thus the SR communication stub may return the cached local list of services to the client.

In one embodiment, in order to even further conserve resources on the client device, the cached local list of services can expire after a set period of time.

In step 405, once the client has received the local cached list of services, the client uses a service from the list.

In step 406, responsive to a determination that the second device on the network which maintains a current list of services can be located, a request for the current list of services is sent to the second device.

For example, in the example environment shown in FIG. 3, device 350 may respond to the broadcast request for discovery of service repository services implemented at other devices on the network sent from node service 301, and may transmit a response from its service repository service back to node service 301. Accordingly, node service 301 can inform SR communication stub 302 of the existence of a service repository service at the device 350 which stores a current list of services on the network, and can transmit a request to the device 350 obtain the current list of services.

In one example, the second device includes a second node service and a full service repository service which communicate with each other using the same predesignated communication framework as that of the first device, and the service repository service of the second device maintains the current list of services by performing service discovery over the network. An example is described in above-mentioned U.S. application Ser. No. 12/717,862.

In step 407, a response containing the current list of services is received from the second device. The request and the response are communicated via a network interface of the client device.

In step 408, a local copy of the current list of services for future use is cached, in the event that there is a subsequent determination that the second device on the network which maintains a current list of devices can not be located. For example, the SR communication stub may cache the current list of services. Thus, in case it later becomes difficult to locate a device with a service repository or a list of services, there will still be a list available to the client from that point in time.

In step 409, the list of services obtained from the network is returned to the client. For example, the SR communication stub on the client device may transmit the list of services to a client service running on a client application.

In step 410, the client uses a service from the list. Accordingly, the client is able to use the mobile device to access and use services on the network.

By calling on another network device to provide a list of network services or providing a cached local list of services if no such device can be found, it is ordinarily possible for a device with constrained resources to participate in network computing, even though it itself might not be completely capable of hosting a full service repository service or otherwise maintaining a list of services available on the network.

Figure 5:
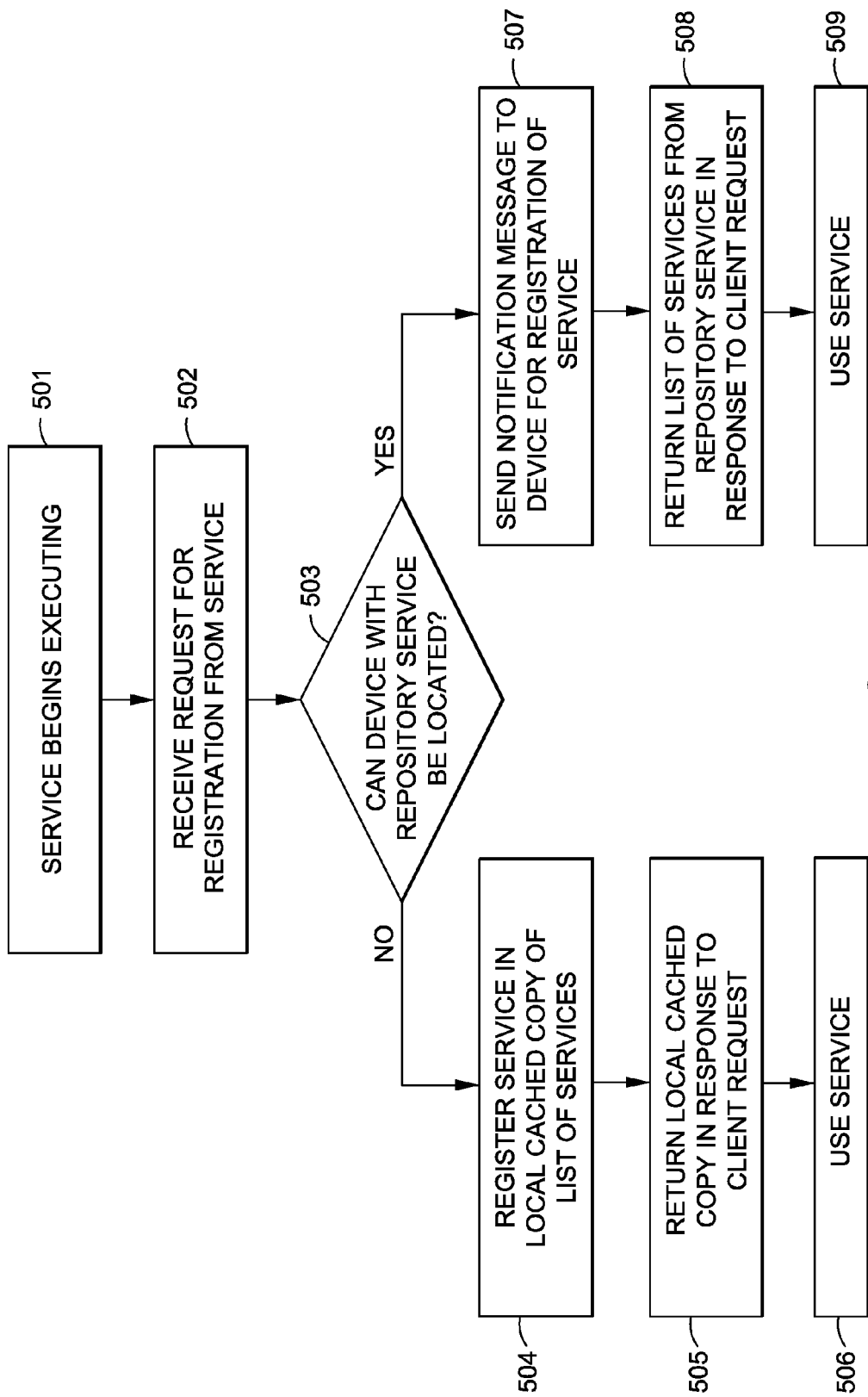
FIG. 5 is a flowchart illustrating a process for registering a service according to an example embodiment.

FIG. 5 is a flowchart illustrating an example process for registration of a service according to an example embodiment.

Briefly, the embodiment of FIG. 5 registers one or more services executing on a first device. The first device includes a network interface for communication with other devices over a network. A request for registration is received from a service executing on the first device. There is a determination of whether a second device on the network, which implements a repository service to maintain a current list of services, can or can not be located. Responsive to a determination that the second device on the network which implements a repository service to maintain a current list of services can not be located, the service is registered in a local cached copy of a list of services. Responsive to a determination that the second device on the network which implements a repository service to maintain a current list of services can be located, a notification message is sent to the second device for registration of the service executing on the first device with the repository service on the second device.

In more detail, in step 501, a service begins newly executing, or is newly added to a client device.

In step 502, a request for registration is received from the newly-executing or newly-added service on the client device (e.g., client device 100). For example, native service 125 or another newly-running service may request to be registered, so as to notify the client device and/or other devices on the network that it is available for use.

In step 503, there is a determination of whether a second device on the network, which implements a repository service to maintain a current list of services, can or can not be located. This determination may occur in substantially the same manner as described above with respect to FIG. 4.

In step 504, responsive to a determination that the second device on the network which implements a repository service to maintain a current list of services can not be located, the service is registered in a local cached copy of a list of services. Thus, at a minimum, it is ordinarily to make the service available locally to a client of the device.

In step 505, the local cached copy of services is returned to a client in response to a client request for a list of services. Thus, responsive to a determination that the second device on the network which implements a repository service to maintain a current list of services can not be located, the local cached copy of the list of services (including the newly-registered service) is returned to the client.

In step 506, the client uses a service from the list. For example, the user may access the newly-registered service.

In step 507, responsive to a determination that the second device on the network which implements a repository service to maintain a current list of services can be located, a notification message is sent to the second device for registration of the service executing on the first device with the repository service on the second device. Thus, in this case, it is ordinarily possible to publish the service to devices on the network, by registering the service in a repository service on the network.

In step 508, the current list of services is returned to the client in response to a client request for a list of services. Thus, responsive to a determination that the second device on the network which implements a repository service to maintain a current list of services can be located, a list of services obtained from the repository service of the second device (including the newly-registered service) is returned to the client, so that the client is provided with the current list of services on the network.

In step 509, a client uses a service from the list. Thus, the client uses the mobile device to access and use services on the network.

In one example embodiment, services that run on the client device request the SR communication stub to publish the service for use by clients residing on other devices, and the SR communication stub requests the node service to remotely register the service. More specifically, the SR communication stub may receive a request for registration from a service executing on the device, and request node service 301 to publish the service across the network. In particular, since the SR communication stub has access to the local service list, responsive to a determination that another service repository exists on the network, the SR communication stub may also provide the local list of services to the node service for transmission to the remote service repository, to be registered there so as to keep the service repository current. In that regard, responsive to a determination that another device on the network which implements a repository service to maintain a current list of services can be located, the node service may send a notification message to the network device for registration of the service.

Alternatively, if there is a determination that another device on the network which implements a repository service to maintain a current list of services can not be located, the SR communication stub may register the service in a local cached list of services.

FIG. 6 is a flowchart illustrating an example process for relinquishing responsibility for a list of services according to an example embodiment.

Briefly, FIG. 6 pertains to relinquishment of responsibility for maintenance of a local cached list of services maintained by a first device. The first device includes a network interface for communication with other devices over a network. A notification message is received from a repository service implemented on a second device on the network. The repository service implemented on the second device maintains a list of services available on the network. Responsive to the notification message received from the second device, the cached list of services on the first device is sent to the repository service implemented on the second device.

In more detail, in step 601, a notification message is received from a repository service implemented on a second device on the network. Thus, the client device is made aware of a service repository on the network, which maintains a list of services on the network.

In step 602, responsive to the notification message received from the second device, the cached list of services on the first device is sent to the repository service implemented on the second device. By relinquishing responsibility for maintenance of a local cached list of services to a device maintaining a list of services on the network, it is ordinarily possible to ensure that local services are shared across the network.

In step 603, a list of services from the service repository service on the second device may be sent to the client, in response to a request for a list of services executing on the client device. Thus, responsive to a determination that the notification message from the repository service implemented on the second device has been received, a list of services obtained from the repository service of the second device is returned. On the other hand, responsive to a determination that the notification message from the repository service implemented on the second device has not been received, the local cached list of services maintained by the first device may be returned to the client.

In step 604, the client uses a service from the list.

In one example embodiment, the SR communication stub obtains a local cached list of services, and provides the local list to the node service, which transmits the local cached list across the network. In particular, in the case that the SR communication stub receives a notification message from a repository service implemented on a second device on the network which maintains a list of services available on the network, the node service may send a local cached list of services to the node service for transmission to the repository service implemented on the second device, responsive to the notification message received from the second device. The SR communication stub module may receive a request for a list of services from a client executing on the first device, and return the list of services from the network to the client.

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for obtaining a list of services consumable by a client executing on a first device, wherein the first device includes a network interface for communication with other devices over a network, comprising:
    receiving a request from the client for a list of services;
    determining whether a second device on the network, which maintains a current list of services, can or can not be located;
    responsive to a determination that the second device on the network which maintains a current list of services can not be located, returning a local cached copy of a list of services to the client;
    responsive to a determination that the second device on the network which maintains a current list of services can be located, performing the following steps of:
        sending a request for the current list of services to the second device;
        receiving a response containing the current list of services from the second device, wherein the request and the response are communicated via the network interface;
        caching a local copy of the current list of services for future use in the event that there is a determination that the second device on the network which maintains a current list of devices can not be located; and
    returning the current list of services to the client,
    wherein a plurality of second devices exist on the network, wherein the service list indicates services available from multiple devices, and wherein the service list is maintained in a distributed fashion over the plurality of second devices on the network.

2. The method according to claim 1, wherein the first device implements a first node service and a Service Repository (SR) communication stub for a service repository service which communicate with each other using a predesignated communication framework, and wherein the SR communication stub performs the steps of receiving the request for the list of services from the client and returning the list to the client.

3. The method according to claim 2, wherein the second device includes a second node service and a service repository service which communicate with each other using the same predesignated communication framework as that of the first device, and wherein the service repository service of the second device maintains the current list of services by performing service discovery over the network.

4. The method according to claim 2, wherein the SR communication stub requests the first node service to determine whether the second device on the network which maintains a current list of services can or can not be located.

5. The method according to claim 1, wherein the step of determining whether a second device on the network which maintains a current list of devices can or can not be located comprises:
    broadcasting a request for discovery of service repository services implemented at other devices on the network; and
    determining whether an announcement from a service repository service is received from another device on the network.

6. The method according to claim 1, wherein the request from the client is filtered to a smaller subset of all available services.

7. The method according to claim 6, wherein the request from the client is filtered by a service type, a set of network nodes to search, one or more service names, by a network location, or by network organization.

8. The method according to claim 1, wherein the local cached copy of a list of services expires after a set period of time.

9. A first device for obtaining a list of services consumable by a client executing on the first device, wherein the first device includes a network interface for communication with other devices over a network, comprising:
    a computer-readable memory constructed to store computer-executable process steps; and
    a processor constructed to execute the computer-executable process steps stored in the memory;
    wherein the process steps stored in the memory cause the processor to:
    receive a request from the client for a list of services;

determine whether a second device on the network, which maintains a current list of services, can or can not be located;

responsive to a determination that the second device on the network which maintains a current list of services can not be located, return a local cached copy of a list of services to the client;

responsive to a determination that the second device on the network which maintains a current list of services can be located, perform the following steps of:

sending a request for the current list of services to the second device;

receiving a response containing the current list of services from the second device, wherein the request and the response are communicated via the network interface;

caching a local copy of the current list of services for future use in the event that there is a determination that the second device on the network which maintains a current list of devices can not be located; and returning the current list of services to the client, wherein a plurality of second devices exist on the network, wherein the service list indicates services available from multiple devices, and wherein the service list is maintained in a distributed fashion over the plurality of second devices on the network.

10. The device according to claim 9, wherein the first device implements a first node service and a Service Repository (SR) communication stub for a service repository service which communicate with each other using a predesignated communication framework, and wherein the SR communication stub performs the steps of receiving the request for the list of services from the client and returning the list to the client.

11. The device according to claim 10, wherein the second device includes a second node service and a service repository service which communicate with each other using the same predesignated communication framework as that of the first device, and wherein the service repository service of the second device maintains the current list of services by performing service discovery over the network.

12. The device according to claim 10, wherein the SR communication stub requests the first node service to determine whether the second device on the network which maintains a current list of services can or can not be located.

13. The device according to claim 9, wherein the step of determining whether a second device on the network which maintains a current list of devices can or can not be located comprises:

broadcasting a request for discovery of service repository services implemented at other devices on the network; and determining whether an announcement from a service repository service is received from another device on the network.

14. The device according to claim 9, wherein the request from the client is filtered to a smaller subset of all available services.

15. The device according to claim 14, wherein the request from the client is filtered by a service type, a set of network nodes to search, one or more service names, by a network location, or by network organization.

16. The device according to claim 9, wherein the local cached copy of a list of services expires after a set period of time.

17. A network module for obtaining a list of services consumable by a client executing on a first device, wherein the first device includes a network interface for communication with other devices over a network, comprising:

a Service Repository (SR) communication stub module for a service repository service, for receiving a request from the client for the list of services and returning the list of services to the client, and for caching a local copy of a current list of services for future use in the event that there is a determination that a second device on the network which maintains a current list of devices can not be located; and a node service module for determining whether the second device on the network, which maintains the current list of services, can or can not be located;

wherein responsive to a determination that the second device on the network which maintains the current list of services can not be located, the SR communication stub module returns a local cached copy of a list of services to the client, and wherein responsive to a determination that the second device on the network which maintains the current list of services can be located, the node service module performs the following steps of:

sending a request for the current list of services to the second device;

receiving a response containing the current list of services from the second device, wherein the request and the response are communicated via the network interface, wherein a plurality of second devices exist on the network, wherein the service list indicates services available from multiple devices, and wherein the service list is maintained in a distributed fashion over the plurality of second devices on the network.

18. The network module according to claim 17, wherein the node service module and the SR communication stub module communicate with each other using a predesignated communication framework.

19. The network module according to claim 18, wherein the second device includes a second node service and a service repository service which communicate with each other using the same predesignated communication framework as that of the first device, and wherein the service repository service of the second device maintains the current list of services by performing service discovery over the network.

20. The network module according to claim 18, wherein the SR communication stub module requests the node service module to determine whether the second device on the network which maintains a current list of services can or can not be located.

21. The network module according to claim 17, wherein the step of determining whether a second device on the network which maintains a current list of devices can or can not be located comprises:

broadcasting a request for discovery of service repository services implemented at other devices on the network; and determining whether an announcement from a service repository service is received from another device on the network.

22. The network module according to claim 17, wherein the request from the client is filtered to a smaller subset of all available services.

23. The network module according to claim 22, wherein the request from the client is filtered by a service type, a set of network nodes to search, one or more service names, by a network location, or by network organization.

24. The network module according to claim 17, wherein the local cached copy of a list of services expires after a set period of time.

25. A non-transitory computer-readable storage medium storing computer-executable process steps for performing a method for obtaining a list of services consumable by a client executing on a first device, wherein the first device includes a network interface for communication with other devices over a network, the method comprising:
   receiving a request from the client for a list of services;
   determining whether a second device on the network, which maintains a current list of services, can or can not be located;
   responsive to a determination that the second device on the network which maintains a current list of services can not be located, returning a local cached copy of a list of services to the client;
   responsive to a determination that the second device on the network which maintains a current list of services can be located, performing the following steps of:
   sending a request for the current list of services to the second device;
   receiving a response containing the current list of services from the second device, wherein the request and the response are communicated via the network interface;
   caching a local copy of the current list of services for future use in the event that there is a determination that the second device on the network which maintains a current list of devices can not be located; and
   returning the current list of services to the client,
   wherein a plurality of second devices exist on the network, wherein the service list indicates services available from multiple devices, and wherein the service list is maintained in a distributed fashion over the plurality of second devices on the network.

26. The storage medium according to claim 25, wherein the first device implements a first node service and a Service Repository (SR) communication stub for a service repository service which communicate with each other using a predesignated communication framework, and wherein the SR communication stub performs the steps of receiving the request for the list of services from the client and returning the list to the client.

27. The storage medium according to claim 26, wherein the second device includes a second node service and a service repository service which communicate with each other using the same predesignated communication framework as that of the first device, and wherein the service repository service of the second device maintains the current list of services by performing service discovery over the network.

28. The storage medium according to claim 26, wherein the SR communication stub requests the first node service to determine whether the second device on the network which maintains a current list of services can or can not be located.

29. The storage medium according to claim 25, wherein the step of determining whether a second device on the network which maintains a current list of devices can or can not be located comprises:
   broadcasting a request for discovery of service repository services implemented at other devices on the network; and
   determining whether an announcement from a service repository service is received from another device on the network.

30. The storage medium according to claim 25, wherein the request from the client is filtered to a smaller subset of all available services.

31. The storage medium according to claim 30, wherein the request from the client is filtered by a service type, a set of network nodes to search, one or more service names, by a network location, or by network organization.

32. The storage medium according to claim 25, wherein the local cached copy of a list of services expires after a set period of time.

33. A method for registering one or more services executing on a first device, wherein the first device includes a network interface for communication with other devices over a network, the method comprising:
   receiving a request for registration from a service executing on the first device;
   determining whether a second device on the network, which implements a repository service to maintain a current list of services, can or can not be located;
   responsive to a determination that the second device on the network which implements a repository service to maintain a current list of services can not be located, registering the service in a local cached copy of a list of services;
   responsive to a determination that the second device on the network which implements a repository service to maintain a current list of services can be located, sending a notification message to the second device for registration of the service executing on the first device with the repository service on the second device,
   wherein a plurality of second devices exist on the network, wherein the service list indicates services available from multiple devices, and wherein the service list is maintained in a distributed fashion over the plurality of second devices on the network.

34. The method according to claim 33, further comprising the steps of:
   receiving a request for a list of services from a client executing on the first device;
   responsive to a determination that the second device on the network which implements a repository service to maintain a current list of services can not be located, returning the local cached copy of the list of services to the client;
   responsive to a determination that the second device on the network which implements a repository service to maintain a current list of services can be located, returning a list of services obtained from the repository service of the second device.

35. The method according to claim 34, wherein the request from the client is filtered to a smaller subset of all available services.

36. The method according to claim 35, wherein the request from the client is filtered by a service type, a set of network nodes to search, one or more service names, by a network location, or by network organization.

37. The method according to claim 33, wherein the local cached copy of a list of services expires after a set period of time.

38. A first device which registers one or more services executing on the first device, wherein the first device includes a network interface for communication with other devices over a network, comprising:
   a computer-readable memory constructed to store computer-executable process steps; and
   a processor constructed to execute the computer-executable process steps stored in the memory;
   wherein the process steps stored in the memory cause the processor to:
   receive a request for registration from a service executing on the first device;
   determine whether a second device on the network, which implements a repository service to maintain a current list of services, can or can not be located;

responsive to a determination that the second device on the network which implements a repository service to maintain a current list of services can not be located, register the service in a local cached copy of a list of services; and responsive to a determination that the second device on the network which implements a repository service to maintain a current list of services can be located, send a notification message to the second device for registration of the service executing on the first device with the repository service on the second device, wherein a plurality of second devices exist on the network, wherein the service list indicates services available from multiple devices, and wherein the service list is maintained in a distributed fashion over the plurality of second devices on the network.

39. The device according to claim 38, wherein the process steps stored in the memory further cause the processor to:

receive a request for a list of services from a client executing on the first device;

responsive to a determination that the second device on the network which implements a repository service to maintain a current list of services can not be located, return the local cached copy of the list of services to the client; and responsive to a determination that the second device on the network which implements a repository service to maintain a current list of services can be located, return a list of services obtained from the repository service of the second device.

40. The device according to claim 39, wherein the request from the client is filtered to a smaller subset of all available services.

41. The device according to claim 40, wherein the request from the client is filtered by a service type, a set of network nodes to search, one or more service names, by a network location, or by network organization.

42. The device according to claim 38, wherein the local cached copy of a list of services expires after a set period of time.

43. A network module for registering one or more services executing on a first device, wherein the first device includes a network interface for communication with other devices over a network, comprising:

a node service module for determining whether a second device on the network which implements a repository service to maintain a current list of services can or can not be located, and for sending a notification message to the second device for registration of a service executing on the first device with the repository service on the second device, responsive to a determination that the second device on the network which implements a repository service to maintain a current list of services can be located; and a Service Repository (SR) communication stub module for a service repository service, for receiving a request for registration from a service executing on the first device, and for registering the service in a local cached copy of a list of services, responsive to a determination that the second device on the network which implements a repository service to maintain a current list of services can not be located, wherein a plurality of second devices exist on the network, wherein the service list indicates services available from multiple devices, and wherein the service list is maintained in a distributed fashion over the plurality of second devices on the network.

44. The network module according to claim 43, wherein the SR communication stub module receives a request for the list of services from a client executing on the first device and returns the list of services to the client, wherein responsive to a determination that the second device on the network which implements a repository service to maintain a current list of services can not be located, the local cached copy of the list of services is returned to the client, and wherein responsive to a determination that the second device on the network which implements a repository service to maintain a current list of services can be located, a list of services obtained from the repository service of the second device is returned to the client.

45. The network module according to claim 44, wherein the request from the client is filtered to a smaller subset of all available services.

46. The network module according to claim 45, wherein the request from the client is filtered by a service type, a set of network nodes to search, one or more service names, by a network location, or by network organization.

47. The network module according to claim 43, wherein the local cached copy of a list of services expires after a set period of time.

48. A non-transitory computer-readable storage medium storing computer-executable process steps for performing a method for registering one or more services executing on a first device, wherein the first device includes a network interface for communication with other devices over a network, the method comprising:

receiving a request for registration from a service executing on the first device;

determining whether a second device on the network, which implements a repository service to maintain a current list of services, can or can not be located;

responsive to a determination that the second device on the network which implements a repository service to maintain a current list of services can not be located, registering the service in a local cached copy of a list of services; and responsive to a determination that the second device on the network which implements a repository service to maintain a current list of services can be located, sending a notification message to the second device for registration of the service executing on the first device with the repository service on the second device, wherein a plurality of second devices exist on the network, wherein the service list indicates services available from multiple devices, and wherein the service list is maintained in a distributed fashion over the plurality of second devices on the network.

49. The storage medium according to claim 48, wherein the method further comprises the steps of:

receiving a request for a list of services from a client executing on the first device;

responsive to a determination that the second device on the network which implements a repository service to maintain a current list of services can not be located, returning the local cached copy of the list of services to the client;

responsive to a determination that the second device on the network which implements a repository service to maintain a current list of services can be located, returning a list of services obtained from the repository service of the second device.

50. The storage medium according to claim 49, wherein the request from the client is filtered to a smaller subset of all available services.

51. The storage medium according to claim 50, wherein the request from the client is filtered by a service type, a set of network nodes to search, one or more service names, by a network location, or by network organization.

52. The storage medium according to claim 48, wherein the local cached copy of a list of services expires after a set period of time.

53. A method for relinquishing responsibility for synchronization of a local cached list of services maintained by a first device, wherein the first device includes a network interface for communication with other devices over a network, the method comprising:
receiving a notification message from a repository service implemented on a second device on the network, wherein the repository service implemented on the second device maintains a list of services available on the network; and
responsive to the notification message received from the second device, sending the cached list of services on the first device to the repository service implemented on the second device,
wherein a plurality of second devices exist on the network, wherein the service list indicates services available from multiple devices, and wherein the service list is maintained in a distributed fashion over the plurality of second devices on the network.

54. The method according to claim 53, further comprising the steps of:
receiving a request for a list of services from a client executing on the first device;
determining whether the notification message from the repository service implemented on the second device has or has not been received;
responsive to a determination that the notification message from the repository service implemented on the second device has not been received, returning the local cached list of services maintained by the first device; and
responsive to a determination that the notification message from the repository service implemented on the second device has been received, returning a list of services obtained from the repository service of the second device.

55. The method according to claim 54, wherein the request from the client is filtered to a smaller subset of all available services.

56. The method according to claim 55, wherein the request from the client is filtered by a service type, a set of network nodes to search, one or more service names, by a network location, or by network organization.

57. The method according to claim 53, wherein the local cached copy of a list of services expires after a set period of time.

58. A first device which relinquishes responsibility for synchronization of a local cached list of services, wherein the first device includes a network interface for communication with other devices over a network, comprising:
a computer-readable memory constructed to store computer-executable process steps; and
a processor constructed to execute the computer-executable process steps stored in the memory;
wherein the process steps stored in the memory cause the processor to:
receive a notification message from a repository service implemented on a second device on the network, wherein the repository service implemented on the second device maintains a list of services available on the network; and
responsive to the notification message received from the second device, send the cached list of services on the first device to the repository service implemented on the second device,
wherein a plurality of second devices exist on the network, wherein the service list indicates services available from multiple devices, and wherein the service list is maintained in a distributed fashion over the plurality of second devices on the network.

59. The device according to claim 58, wherein the process steps stored in the memory further cause the processor to:
receive a request for a list of services from a client executing on the first device;
determine whether the notification message from the repository service implemented on the second device has or has not been received;
responsive to a determination that the notification message from the repository service implemented on the second device has not been received, return the local cached list of services maintained by the first device; and
responsive to a determination that the notification message from the repository service implemented on the second device has been received, return a list of services obtained from the repository service of the second device.

60. The device according to claim 59, wherein the request from the client is filtered to a smaller subset of all available services.

61. The device according to claim 60, wherein the request from the client is filtered by a service type, a set of network nodes to search, one or more service names, by a network location, or by network organization.

62. The device according to claim 58, wherein the local cached copy of a list of services expires after a set period of time.

63. A network module for relinquishing responsibility for synchronization of a local cached list of services maintained by a first device, wherein the first device includes a network interface for communication with other devices over a network, the method comprising:
a node service module for receiving a notification message from a repository service implemented on a second device on the network, wherein the repository service implemented on the second device maintains a list of services available on the network,
wherein the node service module sends the cached list of services on the first device to the repository service implemented on the second device, responsive to the notification message received from the second device,
wherein a plurality of second devices exist on the network, wherein the service list indicates services available from multiple devices, and wherein the service list is maintained in a distributed fashion over the plurality of second devices on the network.

64. The network module according to claim 63, further comprising a Service Repository (SR) communication stub module for receiving a request for a list of services from a client executing on the first device and returning the list of services to the client, wherein the method further comprises the steps of:
determining whether the notification message from the repository service implemented on the second device has or has not been received;
responsive to a determination that the notification message from the repository service implemented on the second device has not been received, returning the local cached list of services maintained by the first device; and responsive to a determination that the notification message from the repository service implemented on the second device has been received, returning a list of services obtained from the repository service of the second device.

65. The network module according to claim 64, wherein the request from the client is filtered to a smaller subset of all available services.

66. The network module according to claim 65, wherein the request from the client is filtered by a service type, a set of network nodes to search, one or more service names, by a network location, or by network organization.

67. The network module according to claim 63, wherein the local cached copy of a list of services expires after a set period of time.

68. A non-transitory computer-readable storage medium storing computer-executable process steps for performing a method for relinquishing responsibility for synchronization of a local cached list of services maintained by a first device, wherein the first device includes a network interface for communication with other devices over a network, the method comprising:
   receiving a notification message from a repository service implemented on a second device on the network, wherein the repository service implemented on the second device maintains a list of services available on the network; and
   responsive to the notification message received from the second device, sending the cached list of services on the first device to the repository service implemented on the second device,
   wherein a plurality of second devices exist on the network, wherein the service list indicates services available from multiple devices, and wherein the service list is maintained in a distributed fashion over the plurality of second devices on the network.

69. The storage medium according to claim 68, wherein the method further comprises the steps of:
   receiving a request for a list of services from a client executing on the first device;
   determining whether the notification message from the repository service implemented on the second device has or has not been received;
   responsive to a determination that the notification message from the repository service implemented on the second device has not been received, returning the local cached list of services maintained by the first device; and
   responsive to a determination that the notification message from the repository service implemented on the second device has been received, returning a list of services obtained from the repository service of the second device.

70. The storage medium according to claim 69, wherein the request from the client is filtered to a smaller subset of all available services.

71. The storage medium according to claim 70, wherein the request from the client is filtered by a service type, a set of network nodes to search, one or more service names, by a network location, or by network organization.

72. The storage medium according to claim 68, wherein the local cached copy of a list of services expires after a set period of time.

* * * * *